UNITED STATES PATENT OFFICE.

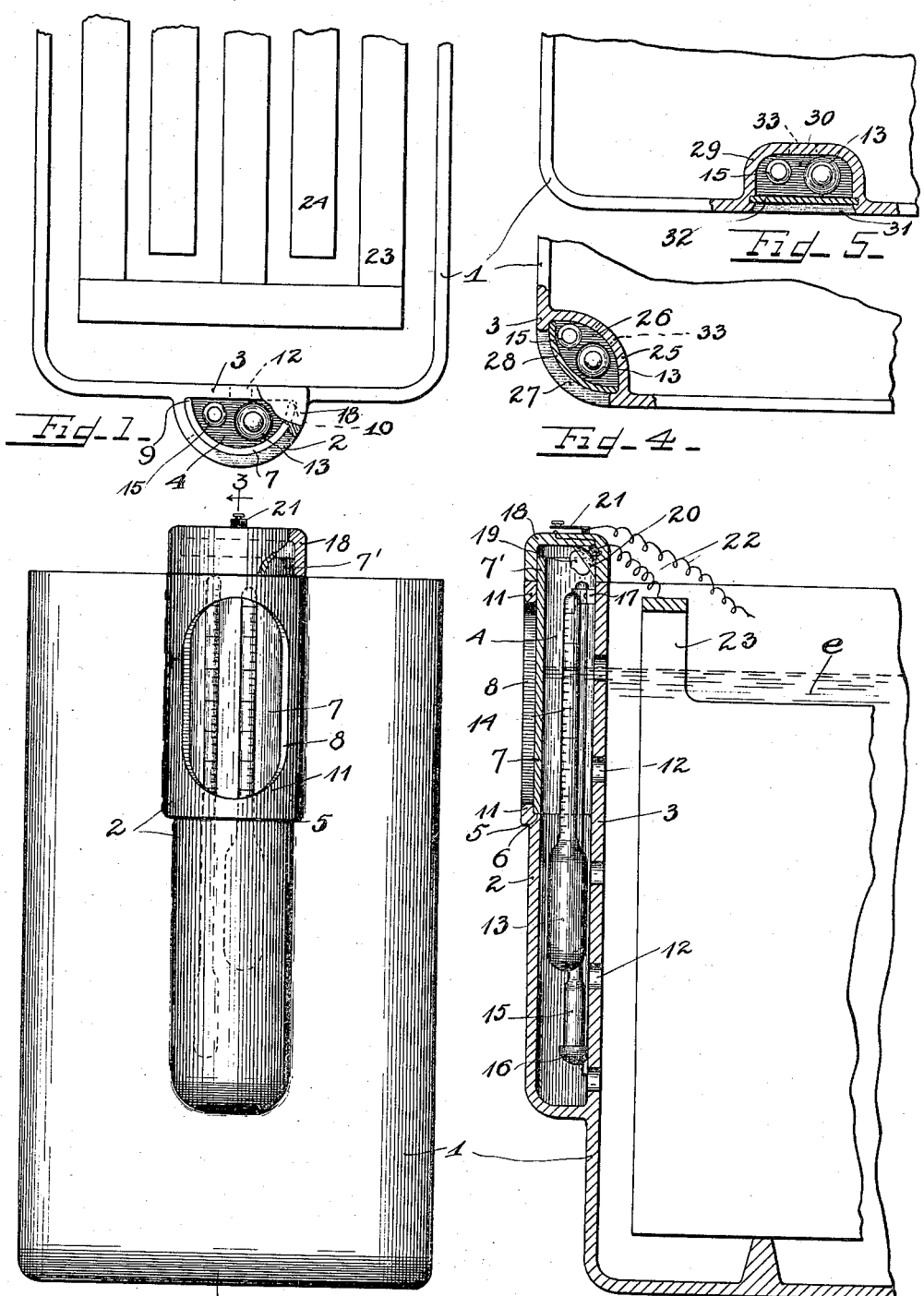

RODERICK MACRAE, OF CHICAGO, ILLINOIS.

PILOT-CELL FOR ELECTRIC STORAGE BATTERIES.

990,893. Specification of Letters Patent. Patented May 2, 1911.

Application filed November 19, 1909. Serial No. 528,871.

*To all whom it may concern:*

Be it known that I, RODERICK MACRAE, a resident of Chicago, in the county of Cook and State of Illinois, have invented certain new and useful Improvements in Pilot-Cells for Electric Storage Batteries, of which the following is a full, clear, and precise specification.

My invention relates to pilot cells for electric storage batteries and contemplates improved and more desirable and efficient construction and arrangement thereof.

In the use of storage batteries particularly for electric vehicle work it is very desirable to be able to ascertain immediately at any time the state of the storage batteries particularly as to the available power at any time. As the charge or power in a battery at any time is directly proportional to the specific gravity of the electrolyte the state of the battery can be obtained from the reading of a hydrometer immersed in the electrolyte. It is very undesirable to carry delicate instruments such as hydrometers or thermometers about one's person or on a vehicle so that tests can be made at any time, and furthermore, the batteries in a vehicle are usually crowded into what space there is available and are not readily accessible so that the instruments could not be readily applied and tests made. The instruments, therefore, should be permanently associated with the battery so that readings can be taken without any preliminary application or adjustment of instruments. The instruments, should, however, be so applied to the cell or cells that they will occupy the least space and will be well protected.

Among the salient objects of my invention, therefore, are to provide an improved form of cell receptacle for accommodating measuring instruments; to provide for such accommodation of measuring instruments without in any way interfering with the plates, electrolyte or other battery parts; to provide such accommodation without requiring additional vehicle space; to provide for ample protection of the instruments; to provide such construction and arrangement that the electrolyte will have free access to the instruments; to provide means for illuminating the scale of the instruments; and in general to provide a pilot cell of more efficient and practical arrangement and construction.

My invention is clearly described in the following specification and illustrated on the accompanying drawing, in which drawing—

Figure 1 is a plan view of one end of a cell showing the instrument compartment and the cap for said compartment partly broken away, Fig. 2 is a front elevation view of the parts shown in Fig. 1, Fig. 3 is a sectional view taken on plane 3—3, Fig. 2, Fig. 4 is a plan view partly in section of the end of a cell receptacle showing a modified arrangement for providing the instrument compartment, and Fig. 5 is a plan view partly in section of one corner of a cell receptacle showing another modified arrangement for providing the instrument compartment.

The cell receptacle 1 which for vehicle use is usually of hard rubber is, in accordance with my invention, provided on one of its faces with a supplemental wall 2 which with the main wall 3 of the receptacle forms a compartment or pocket 4 open only at its upper end. This supplemental wall may be of any shape, being shown as semi-circular in Figs. 1, 2 and 3. The wall may primarily be separate and cemented or otherwise secured to the face of the receptacle or may be an integral part of the main receptacle 1, and the top of the wall is preferably flush with the top of the main receptacle, as shown. Along intermediate line 5 the wall 2 is offset to form an inner semi-annular shoulder 6 for seating the lower edge of a semi-annular glass plate 7. Cut in the front of wall 2 above the offset line 5 is a sight opening 8 which is closed by the glass plate. The ends 9 and 10 of the plate engage against the rear wall 3 and are slightly prolonged so that when the plate is applied its front surface will be pressed with sufficient force against the rim 11 surrounding the sight opening 8 to seal the sight opening. The wall 3 has a number of perforations 12 at various heights so that the electrolyte $e$ may circulate freely through the supplemental compartment 4. The condition of the electrolyte can be readily adjudged by the gasing condition thereof, and for this purpose the uppermost of the perforations 12 preferably appears adjacent the surface of the electrolyte so that the operator when observing the indications on the instruments in the supplemental compartment can also through this uppermost perforation observe the gasing conditions. In the electrolyte in this compartment is floated a hydrometer 13 whose upper end extends past the sight opening 8 and is provided with suitable scale marks 14 indicative of the specific gravity of the electrolyte. If desired, a thermometer 15 may also be immersed in the electrolyte with its upper end extending across the sight opening 8 so that the temperature of the electrolyte can be observed. The thermometer can readily be held in place against the wall 3 or wall 2. As shown, the thermometer is supported in its lower end in a cup frame 16 and its upper end is held in place by a strap 17, the cup frame and strap being preferably of lead in order to withstand the effects of the acid in the electrolyte. The specific gravity, the temperature and the gasing condition of the electrolyte can thus be readily observed through the sight opening 8 and the transparent glass plate 7 which seals the sight opening against the escape of electrolyte. A cap 18 may be provided for closing the upper end of the supplemental compartment and the upper end 7' of the glass plate 7 may extend a distance beyond the top of the main and supplemental receptacles to form a retaining extension for the cap.

It is very desirable that some illuminating means be provided for enabling reading of the instruments in dark places, and a small electric lamp is preferably provided for throwing light rays against the scales of the instruments. As shown in Fig. 3 a desirable arrangement is to mount a lamp 19 on the inner side of the cover 18 and to provide light reflector 20 for reflecting the light rays against the upper end of the glass plate engaged by the rim 11 and cover 18, this section of the glass plate acting as a mirror to reflect the light rays toward the scales on the instrument. A switch 21 is shown mounted on the cap for controlling the lamp current supply circuit 22 which may connect with the positive and negative plates 23 and 24 in the battery, the lamp and its circuit controlling switch forming thus a fixed part of the cell. The lamp, could, however, be applied at some other part of the cell structure to direct its rays against the instrument scales, and the switching mechanism could also be in a different position from that shown.

In Figs. 4 and 5 are shown some modified arrangements for providing a supplemental measuring instrument compartment. In Fig. 4 a supplemental wall 25 extends across the corner of the receptacle and forms with the outer wall 3 of the receptacle the supplemental compartment 26. The sight opening 27 cut in the front wall 3 is sealed by a curved glass plate 28. In Fig. 5 the supplemental wall 29 is applied to the inner side of the main wall 3 of the receptacle and forms with the main wall the supplemental compartment 30 for receiving the measuring instruments. The sight opening 31 cut in the wall 3 is sealed by the glass plate 32. The supplemental walls 25 and 29 in the modifications are provided with openings 33 for allowing free access of electrolyte to the supplemental compartments.

A pilot cell built in accordance with my invention is very useful and particularly adaptable for vehicle batteries. The frame part forming the supplemental compartment and the instruments accommodated thereby in no way interfere with the main part of the cell which at no time need be disturbed in order that readings of the instrument may be taken. The height of the cell is not increased materially so that the cell will easily fit in vehicles. The cells of a battery for vehicle use are usually set in a crate which can easily be slightly remodeled without changing its general dimensions to accommodate the supplemental compartment of the pilot cell. The instruments are always in working condition and are amply protected, and readings can be taken therefrom without touching the cell, the illuminating lamp facilitating reading of the instruments in dark places. The operator is, therefore, enabled to at any time ascertain the conditions of the storage battery.

I do not wish to be limited to the precise constructions and arrangements herein shown, as changes could readily be made which would still come within the scope of my invention, but I desire to secure the following claims by Letters Patent.

1. In a pilot cell for storage batteries, the combination of a receptacle for accommodating electrodes and electrolyte, a supplemental wall coöperating with a section of the receptacle wall to form a compartment for accommodating measuring instruments, said receptacle communicating with said compartment to allow access of the electrolyte to instruments placed within the compartment, said compartment having an opening, a glass plate for sealing said opening and through which instruments can be read, and a cover for said compartment, said glass plate extending beyond the upper edge of the compartment walls to form a retaining ridge for said cover.

2. A receptacle for containing a fluid, a supplemental arch-shaped wall section applied to one wall of the receptacle, said supplemental wall section and the adjacent wall section of the receptacle serving to inclose a supplemental compartment, the adjacent wall section having small openings to allow circulation of fluid between said receptacle and supplemental compartment, said supplemental wall section having a slight opening, and a transparent plate wedged between said supplemental wall section and the adjacent receptacle wall section to securely seal the sight opening against escape of fluid, said supplemental compartment serving to receive instruments for indicating through the sight opening the condition of the fluid.

3. A receptacle for containing a fluid, a semi-circular wall section applied to one wall of the receptacle, said supplemental wall section and the adjacent section of the receptacle wall inclosing a small supplemental testing compartment, said adjacent section having small openings for allowing circulation between the receptacle and the testing compartment, said supplemental wall having a sight opening, and a semi-circular transparent plate wedged between said supplemental wall and the adjacent section of the receptacle wall to securely seal the sight opening against escape of fluid, said test compartment serving to accommodate instruments for indicating through the sight opening the condition of the fluid.

4. A receptacle for storage batteries comprising a complete main receptacle part, and a supplemental wall section bridging a section of the main receptacle part wall and forming with said section a test pocket or compartment for accommodating instruments for indicating the condition of electrolyte in the receptacle, said supplemental wall section having a sight opening adjacent the top of the electrolyte, there being openings through the section of the main receptacle bridged by the supplemental wall section for allowing free circulation of electrolyte between the main receptacle part and the test pocket, one of said openings serving as a sight passageway into the main receptacle part adjacent the surface of the electrolyte whereby observation can be taken through the sight opening of the instruments in the test pocket and of the condition of the electrolyte at the surface.

5. In an apparatus for indicating the condition of a storage battery, a receptacle communicating with the storage battery cell and formed in part by the walls thereof, said receptacle being adapted to contain a portion of the electrolyte of said battery, a hydrometer in said receptacle, and a window of transparent material secured to said receptacle.

In witness hereof, I hereunto subscribe my name this 15th day of November, A. D. 1909.

RODERICK MACRAE.

Witnesses:
   CHARLES J. SCHMIDT,
   NELLIE B. DEARBORN.